US008101908B2

(12) United States Patent
Senko

(10) Patent No.: US 8,101,908 B2
(45) Date of Patent: Jan. 24, 2012

(54) MULTI-RESOLUTION SCAN

(75) Inventor: Michael W. Senko, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 212 days.

(21) Appl. No.: 12/432,658

(22) Filed: Apr. 29, 2009

(65) Prior Publication Data

US 2010/0276583 A1 Nov. 4, 2010

(51) Int. Cl.
*B01D 59/44* (2006.01)
*B01D 59/00* (2006.01)

(52) U.S. Cl. ......... 250/282; 250/281; 250/284; 250/288

(58) Field of Classification Search .................. 250/281, 250/282, 284, 288
See application file for complete search history.

(56) References Cited

U.S. PATENT DOCUMENTS 4,837,434 A * 6/1989 James .......................... 250/281
5,397,894 A 3/1995 Wells et al.
5,420,425 A 5/1995 Bier et al.
5,696,376 A * 12/1997 Doroshenko et al. ......... 250/292
6,177,668 B1 * 1/2001 Hager .......................... 250/282
6,403,955 B1 * 6/2002 Senko .......................... 250/292
7,034,294 B2 * 4/2006 Schwartz et al. ............. 250/292
7,238,936 B2 * 7/2007 Okamura et al. ............. 250/284
7,312,441 B2 * 12/2007 Land et al. .................... 250/282
7,381,947 B2 * 6/2008 Senko .......................... 250/292
7,511,267 B2 * 3/2009 Zabrouskov .................. 250/282
7,582,865 B2 * 9/2009 Schwartz et al. ............. 250/292
7,692,142 B2 * 4/2010 Schwartz et al. ............. 250/290
2002/0121597 A1 * 9/2002 Tanner et al. ................ 250/288
2007/0207555 A1 9/2007 Guerra et al.
2008/0087816 A1 4/2008 McCauley et al.
2008/0230691 A1 9/2008 Hager
2008/0248585 A1 10/2008 Chen et al.
2010/0276586 A1 * 11/2010 Senko .......................... 250/283

* cited by examiner

*Primary Examiner* — David A Vanore
(74) *Attorney, Agent, or Firm* — Michael C. Staggs

(57) ABSTRACT

A multi-resolution mass spectrometer system and intra-scanning method is introduced to enhance the measured peak resolution at different regions of a given mass spectrum while not significantly increasing the total duration of the scan. Such an arrangement enables extra resolution where necessary, such as, for example, when incorporating a slower scan rate only over a predetermined narrow low mass marker region of a given mass spectrum. Once past the marker region, the scan rate can be increased to provide the appropriate resolution for peptide identification.

7 Claims, 3 Drawing Sheets

| Scan Rate (amu/sec) | | | | |
|---|---|---|---|---|
| | Velos | LTQ | LXQ | Fleet |
| Turbo | 125000.00 | 125000.00 | 125000.00 | 80000.00 |
| Normal | 33333.33 | 16666.67 | 16666.67 | 12500.00 |
| Enhanced | 10000.00 | 5000.00 | 5000.00 | 5000.00 |
| Zoom | 2222.22 | 1111.11 | 1111.11 | 1111.11 |
| Ultrazoom | 27.78 | 27.78 | 27.78 | 27.78 |
| HM Turbo | 16666.67 | 16666.67 | 16666.67 | 16666.67 |
| HM Norm | 10000.00 | 2500.00 | 2500.00 | 2500.00 |
| HM Zoom | 555.56 | 138.89 | 138.89 | 138.89 |

FIG. 3A

| Scan Rate (ms/amu) | | | | |
|---|---|---|---|---|
| | Velos | LTQ | LXQ | Fleet |
| Turbo | 0.008 | 0.008 | 0.008 | 0.0125 |
| Normal | 0.03 | 0.06 | 0.06 | 0.08 |
| Enhanced | 0.1 | 0.2 | 0.2 | 0.2 |
| Zoom | 0.45 | 0.9 | 0.9 | 0.9 |
| Ultrazoom | 36 | 36 | 36 | 36 |
| HM Turbo | 0.06 | 0.06 | 0.06 | 0.06 |
| HM Norm | 0.1 | 0.4 | 0.4 | 0.4 |
| HM Zoom | 1.8 | 7.2 | 7.2 | 7.2 |

FIG. 3B

MULTI-RESOLUTION SCAN

BACKGROUND OF THE INVENTION

1. Field of the Invention

The present invention relates to the field of mass spectrometry, and more particularly to a mass spectrometer system and intra-scan method for increasing the measured peak resolution at different regions of a given mass spectrum while not significantly increasing the total duration of the scan.

2. Discussion of the Related Art

Data-dependent acquisition involves using data derived from an experimentally-acquired mass spectrum in an "on-the-fly" manner to direct the subsequent operation of a mass spectrometer; for example, a mass spectrometer may be switched between MS and MS/MS scan modes upon detection of an ion species of potential interest. Utilization of data-dependent acquisition methods in a mass spectrometer provides the ability to make automated, real-time decisions in order to maximize the useful information content of the acquired data. Current systems and methods that provide for real time data dependent functionality include, but are not limited to: the Data Dependent Experiment™ (DDE) tool utilized by Thermo Finnigan LLC of San Jose, Calif., the Data Directed Analysis (DDA) tool by Waters Corporation (Micromass™) and the Information Dependant Acquisition™ (IDA™) system marketed by MDS Sciex Inc. and Applera Corporation.

Data-dependent acquisition methods may be characterized as having one or more input criteria, and one or more output actions. The input criteria employed for conventional data-dependent methods are generally based on parameters such as intensity, intensity pattern, mass window, mass difference (neutral loss), mass-to-charge (m/z) inclusion and exclusion lists, and product ion mass. The input criteria are employed to select one or more ion species that satisfy the criteria. The selected ion species are then subjected to an output action (examples of which include performing MS/MS or $MS^n$ analysis and/or high-resolution scanning). In one instance of a typical data-dependent experiment, a group of ions are mass analyzed, and precursor ion species having mass spectral intensities exceeding a specified threshold are subsequently selected as precursor ions for MS/MS analysis, which may involve operations of isolation, dissociation (i.e., fragmentation) of the precursor ions, and mass analysis of the product ions.

Generally, a mass spectrometer configured to provide such operations most often includes: an ion source to transform introduced molecules in a sample into ionized fragments; an analyzer to separate such ionized ions by their masses by applying electric and magnetic fields; and a detector to measure and thus provide data for identifying and calculating the abundances of each ion fragment present. Moreover, such a mass spectrometer system often can and does include a two-dimensional (2D) and/or a three-dimensional (3D) ion trap that enables the forming and storage of ions over a large range of masses for relatively large periods of time. Eventually, the interrogation of the contents of such ion traps is necessary, which may require different scanning implementations at designed scanning rates so as to provide a given resolution.

However, a constraint that has continued to limit the capabilities of such 2D and 3D ion trap instruments is that different regions of a scanned resultant mass spectrum often requires different resolutions to obtain the analytical objectives of the experiment. As an illustration, a commercial ion trap (e.g., an LTQ linear ion trap spectrometer from Thermo Fisher Scientific) scanned at a fixed rate of 16,666 Da/Sec may be preferably selected as a rate of choice based on the desire to achieve unit mass resolution but unit resolution may not prove sufficient in selected regions of the mass spectrum. One way of overcoming such a problem includes, but is not limited to, reducing the scanning rate across the entire desired mass spectrum.

Still, while reducing the scan rate is an effective way to improve the mass resolution, the time it takes to scan between masses can often involve a significant time increase, which can among other problems present practical problems in terms of the length of the experiment and can add complications with respect to system electronics that require stabilization time periods and/or that may drift and induce deleterious mass axis instabilities.

Background information on a mass filter system that alternates between a fast scan (i.e., measurement scan) and a slow scan (i.e., a survey scan) based on a pre-scan map, is described and claimed in U.S. Pat. No. 4,837,434, entitled, "Mass Spectrometry System And Method Employing Measurement/Survey Scan Strategy," issued Jun. 6, 1989, to James, including the following, "A gas chromatography plus mass spectrometry system implements a scan strategy in which each full range scan alternates between a normal measurement mode and a survey mode based on a block/gap map made during the previous scan. Survey mode is used within regions that were determined in the previous scan to lack signal above a predetermined threshold. Spectral data is generated during measurement mode operation. Each scan serves both measurement and mapping functions in a way that avoids mass filter jumps, since each scan is monotonic over the entire scanning range."

Background information for a system that provides for high mass resolution scanning of an ion trap's contents, is described and claimed in U.S. Pat. No. 5,397,894, entitled, "Method Of High resolution Scanning Of An Ion Trap Mass Spectrometer," issued Mar. 14, 1995, to Wells et al., including the following, "A method of using a quadrupole ion trap mass spectrometer for high resolution mass spectroscopy is disclosed. High resolution of a mass spectrum of a desired species is achieved by first using a slow scanning rate and by first ridding the trap of unwanted ions. Accurate mass calibration is achieved by using a reference compound of known mass and using a second supplemental AC dipole voltage to eject the reference ions at nearly the same time as the sample ions of interest are ejected from the trap. This eliminates the need to scan the trap between the between the masses of the sample and reference ions . . . "

Accordingly, a need exists for a mass spectrometer system that utilizes an intra-scan method of providing different resolutions to desired regions of a mass spectrum without significantly increasing the duration of the scan. The present invention is thus directed to such a need.

SUMMARY OF THE INVENTION

Accordingly, the present invention provides for an intra-scan method to enhance the measured peak resolution at different regions of a given mass spectrum while not significantly increasing the total duration of the scan. In particular, the present invention provides a method that includes: providing one or more product ions in a trapping chamber configured within a multi-resolution mass spectrometer; scanning the trapping chamber at a known discrete scan rate within a first m/z region to provide for an appropriate first resolution of the one or more product ions; switching to one or more desired discrete scanning rates within other desired m/z regions so as to enable one or more other appropriate resolutions of the one or more product ions; and outputting to a user, a mass spectrum representative of said known rate and said one or more desired scanning rates.

The methods and apparatus, as disclosed herein, are most beneficially applied for MS/MS or $MS^n$ methods. In these cases, there is additional knowledge on the nature of the ions in the trap and this knowledge can be applied to best configure the various scan rates and scan regions.

In accordance with another aspect of the present invention, the present invention provides for an automated multi-resolution mass spectrometer. In particular, the spectrometer includes an ion trapping chamber and a scanning means configured to scan one or more product ions within the ion trapping chamber at a known discrete scan rate over a desired m/z region to provide for an appropriate first resolution of the ions. Thereafter, the scanning means is switched to scan such a trapping chamber at one or more discrete scanning rates within other desired m/z regions of the mass spectrum scan so as to provide for one or more other appropriate resolutions of the desired trapped product ions. Such an apparatus then is capable of having acquired data to be recorded and analyzed and thereafter displayed to indicate data resultant from the combined scan.

Accordingly, the present invention provides for an apparatus and method of operation that enables multiple peak resolutions (via desired discrete scanning rates) at different regions of a given mass (m/z) spectrum while not significantly increasing the total duration of the scan.

BRIEF DESCRIPTION OF THE DRAWINGS

FIGS. 3A-3B show example scan rate charts in (amu/sec) and (ms/amu) for example ion trap based instruments that can be utilized by the present invention.

DETAILED DESCRIPTION

Figure 1:
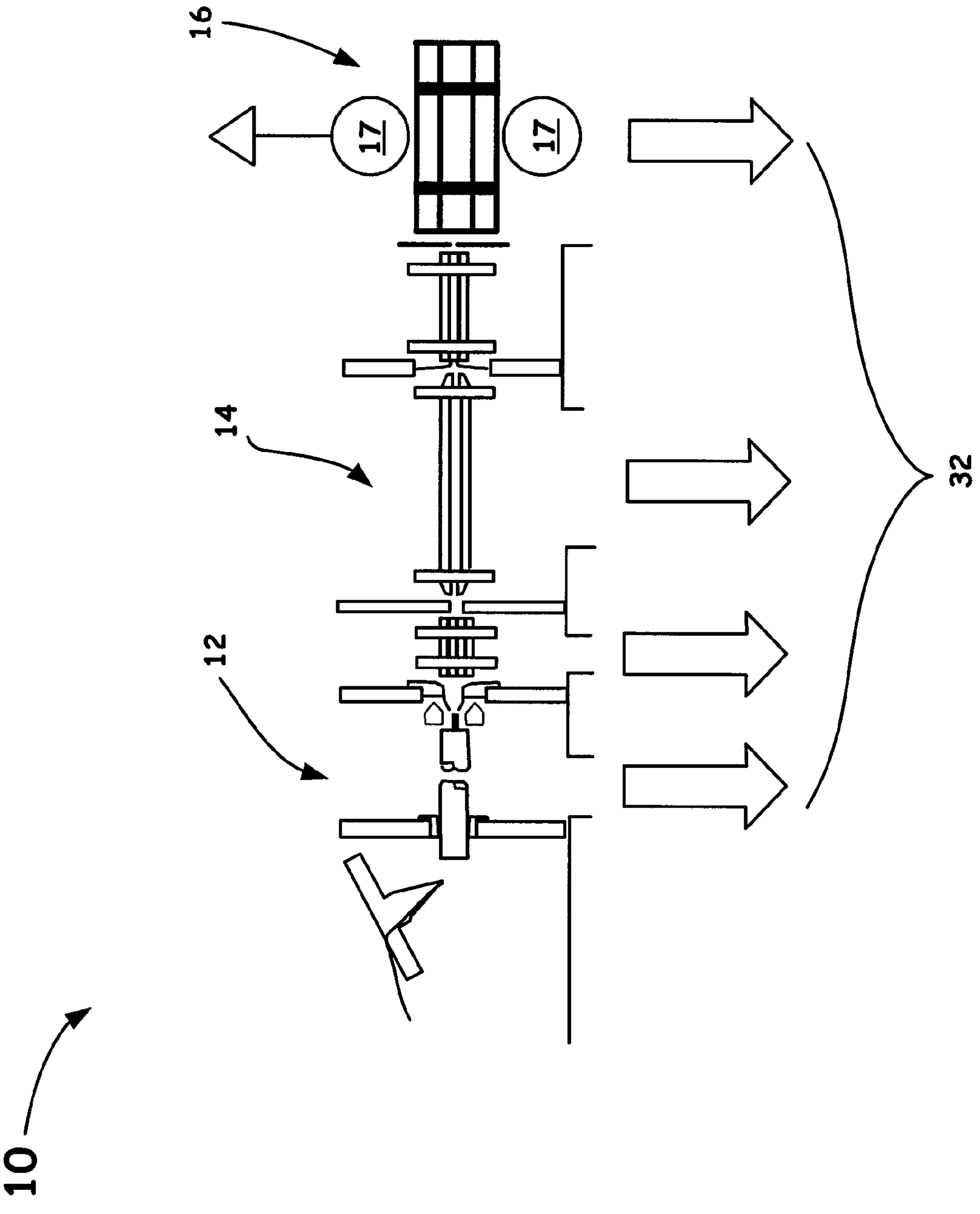
FIG. 1 shows an example mass spectrometer system of the present invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise.

In addition, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The present invention is directed to a novel automated system and intra-scan method that provides for different resolutions and thus different scan rates so as to optimize the overall quality and quantity of the measured mass spectrum while not significantly increasing the duration of the total analytical scan.

As an illustration of a beneficial method of operation, isobaric tagging methods, such as, but not limited to, Tandem Mass Tag (TMT) and/or iTRAQ reporter ions are often utilized for qualification and quantitation of desired molecular species. Thus, an ion trap's contents (i.e., a bundle of one or more ions) within a system, as disclosed herein, can be scanned at a predetermined rate to resolve the ions in the low mass reporter region. Once past the reporter ions marker region, the scan rate can be increased as desired by a user or automatically via, for example, a computer controlled manipulation. Such a method of operation provides for the extra resolution where necessary but does not significantly increase the total duration of the scan time because the slower scan rates are used only over predetermined narrow regions of the mass spectrum. By utilizing known scan rates in the desired low mass region of the spectrum only, detector saturation and non-linearity issues are minimized while resolving isobaric interferences that normally distort reporter ion ratios.

Another beneficial example embodiment of the present invention provides for the analysis of MS/MS data from multiply charged precursor ions. For example, a 2 kDa peptide that is doubly charged appears at about 1000 m/z. However, a captured MS/MS spectrum can show both singly and doubly charged fragments below 1000 m/z. To overcome this problematic application, the present invention can be configured to scan an ion trap's contained bundle of ions slower than the normal scan rate to clearly separate isotopic peaks. Since only singly charged ions can appear above the 1000 m/z region, the instrument in a predetermined manner can then run at a higher (i.e., faster) scan rate once past the detected m/z region sufficient to resolve and identify unit space isotopes.

Specific Description

FIG. 1 shows a beneficial example configuration of a mass spectrometer instrument, shown generally designated by the reference numeral 10, which is capable of being utilized with the methods of the present invention. It is to be appreciated that mass spectrometer 10 is presented by way of a non-limiting beneficial example and thus the present invention may also be practiced in connection with other mass spectrometer systems having architectures and configurations different from those depicted herein. Moreover, while the spectrometer 10 of FIG. 1 is generally shown and described herein with reference to a two-dimensional (2D) linear ion trap 16, it is to be understood that the methods of the present invention can also be beneficially utilized in connection with three-dimensional (3D) ion traps (not shown).

No matter what particular ion 2D or 3D ion trapping chamber means is utilized, such analyzing devices, which are capable of performing both mass analysis and dissociation functions within a common structure, are eventually scanned at different rates by any of the known methods known and understood by those of ordinary skill in the art so as to determine the contents of the trap. For example, scanning the contents can include the mass selective instability scan, as described in U.S. Pat. No. 4,540,884, or enhanced forms of the instability scan (e.g., resonance ejection), as described in U.S. Pat. No. 4,736,101, the disclosures of which are herein incorporated by reference in their entirety.

In addition, the ion traps of the present invention can also be combined with other beneficial features that are known in the industry, such as, but not limited to, Normalized Collision Energy, Stepped Normalized Collision Energy, as well as Automatic gain control (AGC). AGC in particular, includes first injecting ions into the ion trap for some predetermined time using some gating optical element, typically in a pre-scan. A measurement of the resultant signal in the pre-scan is taken, and a calculation is then performed to determine what injection time (i.e. how long the gate is open) is needed to yield a specified "target" amount of signal, the target being the optimum signal which avoids saturation or space charge effects in the trap. A useful technique that incorporates such an automatic ion supply control feature is described and claimed in U.S. Pat. No. 5,572,022, entitled "Method And Apparatus Of Increasing Dynamic Range And Sensitivity Of A Mass Spectrometer," issued Nov. 5, 1996, to Schwartz et al., the disclosure of which is incorporated be reference in its entirety.

With respect to the example linear trap device shown in FIG. 1, it is known to those of ordinary skill in the art that such a structure often comprises pairs of opposed elongated electrodes aligned across orthogonal X and Y dimensions. Ions are contained in a region within the interior by the application of RF trapping voltages to electrode pairs in combination with an applied axial DC field that collects ions in the interior portions of the ion trap. As part of the configuration, predetermined apertures enable expulsion of ions for subsequent detection. Although quadrupole arrangements are often beneficially utilized, other multipole configurations, such as, for example, hexapoles, octupoles, decapoles, etc., can also be utilized within a mass spectrometer system 10 that uses the methods of operation of the present invention.

Thus, as part of the mass spectrometer 10 system, as generally shown in FIG. 1, a sample containing one or more analytes of interest can be ionized via an ion source 12 using any of the applicable techniques known and understood by those of ordinary skill in the art. Such techniques can include, but are not strictly limited to, Electron Ionization (EI), Chemical Ionization (CI), Matrix-Assisted Laser Desorption Ionization (MALDI), Electrospray Ionization (ESI), Atmospheric Pressure Chemical Ionization (APCI), Nanoelectrospray Ionization (NanoESI), and Atmospheric Pressure Ionization (API), etc.

The resultant ions are directed via predetermined ion optics 14 that often can include tube lenses, skimmers, and multipoles selected from radio-frequency RF quadrupole and octopole ion guides, etc., so as to be urged through a series of chambers of progressively reduced pressure that operationally guide and focus such ions to provide good transmission efficiencies. The various chambers communicate with corresponding ports 32 (represented as arrows in the figure) that are coupled to a set of pumps (not shown) to maintain the pressures at the desired values. The operation of mass spectrometer 10 is controlled and data is acquired (e.g., by scanning the ion trap) and processed by a control and data system (not depicted) of various circuitry of a known type, which may be implemented as any one or a combination of general or special-purpose processors (digital signal processor (DSP)), firmware, software to provide instrument control and data analysis for mass spectrometers and/or related instruments, and hardware circuitry configured to execute a set of instructions that embody the prescribed data analysis and control routines of the present invention. Such processing of the data may also include averaging, scan grouping, deconvolution, library searches, data storage, and data reporting.

It is also to be appreciated that instructions to start predetermined slower or faster scans as disclosed herein, the identifying of a set of m/z values within the raw file from a corresponding scan, the merging of data, the exporting/displaying/outputting to a user of results, etc., may be executed via a computer based system (e.g., a controller) which includes hardware and software logic for performing the aforementioned instructions and control functions of the mass spectrometer 10.

In addition, such instruction and control functions, as described above, can also be implemented by a mass spectrometer system 10, as shown in FIG. 1, as provided by a machine-readable medium (e.g., a computer readable medium). A computer-readable medium, in accordance with aspects of the present invention, refers to mediums known and understood by those of ordinary skill in the art, which have encoded information provided in a form that can be read (i.e., scanned/sensed) by a machine/computer and interpreted by the machine's/computer's hardware and/or software.

Thus, as mass spectral data of a given spectrum is received by a beneficial mass spectrometer 10 system disclosed herein, the information embedded in a computer program of the present invention can be utilized, for example, to extract data from the mass spectral data, which corresponds to a selected set of mass-to-charge ratios. In addition, the information embedded in a computer program of the present invention can be utilized to carry out methods for normalizing, shifting data, or extracting unwanted data from a raw file in a manner that is understood and desired by those of ordinary skill in the art.

In an example method of operation of the present invention, a user defines an operation by specifying the measurement input criteria and resultant (manual or automatic) action criteria, e.g., m/z range, intensity threshold, charge state (e.g., +1, +2, +2-3, etc.), one or more scan speeds, dissociation type, etc. Thereafter, the selected single bundle of peptide or protein precursor ions are often isolated and fragmented within the ion trap 16 device based upon desired input charge state criteria using any of the known processes selected solely or in combination, as understood by those skilled in the art. For example, isolation can be effected by application of a broadband waveform to the ion trap electrodes, the waveform having a narrow frequency notch centered about the secular frequency of the selected precursor ion such that all ions except the selected precursor ion are resonantly excited and consequently removed from the ion trap. With respect to fragmentation, such a process may be accomplished by collision activation dissociation (CAD), infrared multi-photon photodissociation (IRMPD), electron transfer dissociation (ETD, described in U.S. Patent Publication No. US2005/0199804, the disclosure of which is incorporated herein), and/or pulsed q dissociation (PQD U.S. Pat. No. 6,949,743 B1). Following isolation and fragmentation of the single bundle of precursor ions, an analytical scan is performed to generate an MS/MS spectrum of the resultant product ions using the predetermined (e.g., discrete) scanning rates as disclosed herein.

However, as stated above, a captured spectrum, as enabled via a configured detector 17 (e.g., an electron multiplier or other known means understood in the art), such as an MS/MS spectrum using such isolation and fragmentation processes, often can have multiply charged fragments at lower m/z. Moreover, problematic areas can additionally occur when using TMT or isobaric (iTRAQ™) labeling techniques. For example, when using TMT or isobaric (iTRAQ™) labeling techniques that produce low mass reporter ions during, for example, MS/MS fragmentation processes, it is known to those skilled in the art that such an MS/MS spectra can result in relatively low mass accuracy and resolution depending on the chosen trapping parameters and scanning speed, making such fragmented marker ions difficult, which can often produce imprecise results. In addition, significant isobaric interferences that can distort marker ion ratios in the low mass region are common and can detrimentally affect the precision of quantitation as well as identification. As an example, interferences at 115.086 and 116.070 can make them indistinguishable from corresponding iTRAQ reporter ions at m/z 115.108 and 116.111.

As a method to resolve the example scenarios, as discussed above (e.g., multiply charged isotopic peaks or low mass reporter ion peaks), a user can select a criteria that reduces the scanning rate across the entire desired mass spectrum so as to desirably resolve predetermined m/z regions (e.g., lower mass regions) as well as other desired regions of a given mass spectrum. However, such a method can significantly increase the measurement period because a slower scanning rate decreases the mass window that can be scanned (i.e., it can become impractical based on time to scan between masses that comprise a wide m/z range) and can present a myriad of practical problems as generally discussed above, e.g., detector non-linearities and saturation, etc., if the measurement time period becomes unduly significant.

To address such issues, the present invention provides for a beneficial solution for minimizing the entire scan time when attempting to resolve, for example, multiply charged peaks or peaks induced via TMT or isobaric (iTRAQ™) reporter ions. To illustrate by example, the present invention can be configured with a slower scanning rate over a desired (e.g., known) region of the overall mass spectrum and thereafter, upon passing the desired region(s) (e.g., the precursor m/z region or the 126 m/z to about the 131 m/z low mass ion marker region), be automatically increased (switched) to a higher scanning rate to provide for the appropriate resolution. Such a novel method of the present invention beneficially results in high quality accurate mass MS/MS spectra in complex protein digests within a manageable time frame.

As an example, for a scan run at the normal rate (e.g., 16,666 amu/sec on an LTQ from Thermo Fisher Scientific, across about 2000 m/z), the total scan takes approximately 120 milliseconds. Running at a zoom scan rate of, for example, about 1111.11 amu/sec on the same LTQ instrument only across a desired region, i.e., about the reporter markers 10 m/z region, increases the scan time only by about another 8.4 milliseconds if the remainder of the scan is reset to scan at the normal rate. To appreciate why this is significant, if a user is to run the entire scan at the aforementioned zoom scan rate of 1111.11 amu/sec, the scan time is increased significantly by about 1.68 seconds. However, as a result of using the multi-resolution scanning technique of the present invention, the practical problems, as stated above, such as, but not limited to, detector saturation and non-linearities, system electronics stabilization issues, time management, etc., are minimized or eliminated due to the reduced total scan periods.

It is also to be appreciated that in those situations where implemented low mass reporter ions are potentially obscured or occluded based on the utilized fragmentation process, a system of the present invention can also be beneficially configured to operate using pulsed Q-dissociation (PQD), the technique of which is described in U.S. Pat. No. 6,949,743 B1 and of which is incorporated herein by reference in its entirety. Generally described, PQD is a technique that eliminates the low mass cut-off concern inherent with all ion traps. This results in extensive coverage for predicted and unpredicted metabolites, and the ability to perform peptide quantification using, for example, iTRAQ labels.

In particular, PQD involves putting one or more precursor ions contained in a trap at a high q value between about 0.6 up to about 0.8 in conjunction with a short (e.g., about 100 μs in duration) high amplitude pulse to provide for resonance excitation of desired ions. The ions are held at the high q for a short period of time (e.g., up to about 100 μs), which by design enables the kinetic energy of the ions at resonance to be converted into internal energy through collisions, but not long enough for significant dissociation to occur. Thereafter, the precursor ions' q value is pulsed to a low value by dropping the RF amplitude and allowing such ions to undergo fragmentation at this low q value. Such a method of activating at high Q values and collecting fragments at low q values results in an information-rich mass spectrum. Thus, when using TMT or iTRAQ™ marker ions in conjunction with PQD, a broader mass spectrum that includes resultant low mass fragmented ions in addition to ions past the low mass marker region can be collected using the novel multi-resolution scanning techniques of the present invention that are described herein.

Figure 2:
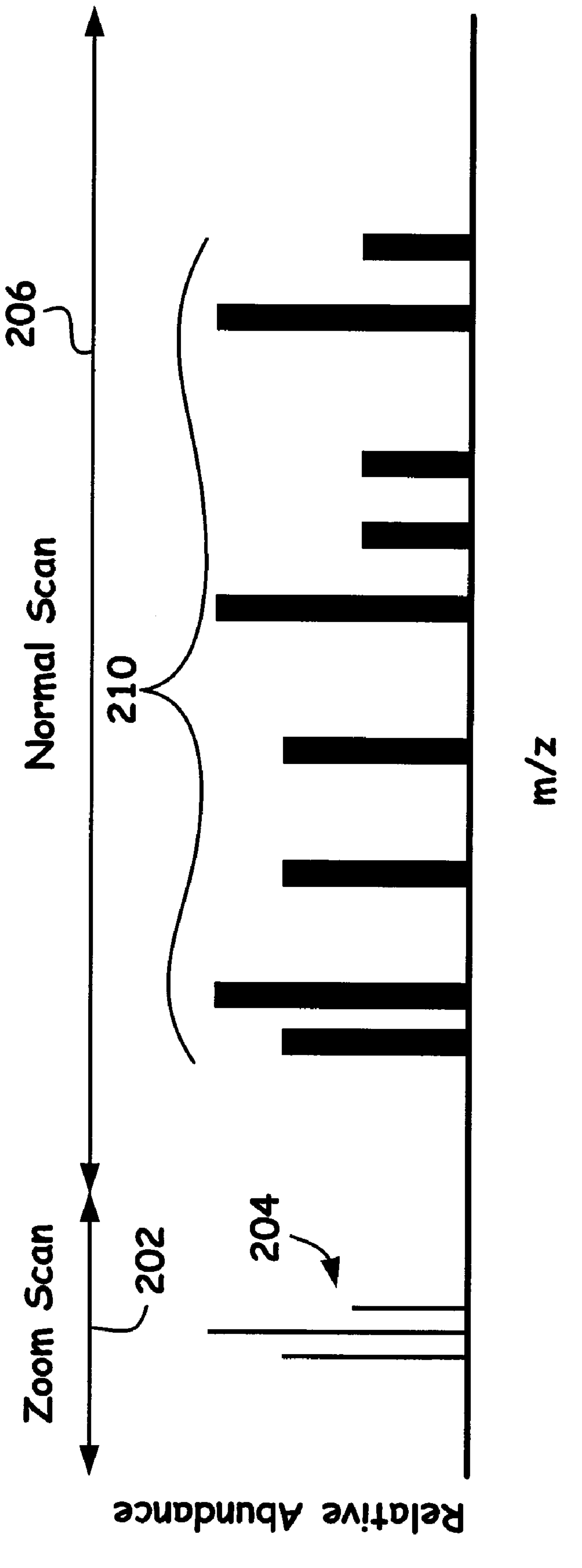
FIG. 2 shows a general method of operating at different scan rates in different sections an information-rich mass spectrum.

FIG. 2 shows a general method plot of the present invention that indicates relative abundance versus example m/z acquired spectra. Thus, a mass spectrometer 10, as shown in FIG. 1, can be directed to scan the contents of an ion trap at a different rate (e.g., a zoom scan rate 202) so as to resolve desired m/z values 204 that require a higher resolution. Upon passing such a region of the mass spectrum, the contents of the trap can then be scanned at a more appropriate rate (e.g., a system's normal scan rate 206) so as to not only still quantitatively and qualitatively identify higher m/z values 210 of interest, but to minimize unnecessary overall scan times of the overall desired mass spectrum.

FIG. 3A and FIG. 3B respectively show example scan rate charts in (amu/sec) and for the readers convenience (ms/amu) that are often utilized in the listed example ion trap based instruments provided by Thermo Fisher Scientific and of which can be incorporated with the methods and systems presented herein. While informative, it is to be understood that the charts depicted in FIGS. 3A-3B are presented to merely illustrate that various commercial systems often can, but not necessarily, comprise set scanning velocities due to system electronics and performance constraints.

Thus, from the example plot shown in FIG. 3A for a commercial LTQ, a user of such an instrument may configure the system to scan at a predetermined discrete rate, e.g., a normal scan rate of 16666.67 (amu/sec) for an LTQ, that translates to a scan time per amu of 0.06 (ms/amu), as shown in FIG. 3B. Such a rate, as discussed above, is appropriate to provide unit resolution within certain mass ranges of a given overall spectra. However, while such a rate may be adequate for nominally resolving peaks with unit spacing, this rate may not be the desired rate to resolve other desired mass ranges, such as, for example, regions that include doubly charged product ions.

Thus, from the given LTQ instrument's example rate specifications shown in FIGS. 3A-3B, a discrete rate for the LTQ of 5000 (amu/sec) may be preferably selected for particular region to provide for the appropriate scanning velocity and thus resolve, in this example scenario, such doubly charged product ions. Once past the predetermined region, the system is often switched automatically, via system hardware or software routines, or in some instances if desired, manually by a user to shift to any other desired appropriate discrete rate, i.e., the normal scanning speed of 16666.67 (amu/sec), as shown in FIG. 3A, or any other rate (e.g., an LTQ turbo rate of 125,000.00 (amu/sec), as shown in the first row of FIG. 3A) if that rate is a more appropriate rate to resolve the predetermined m/z regions of a desired mass spectrum. For an example peptide of 2000 Da, the doubly charged precursor appears at approximately 1000 m/z. The enhanced scan rate (0.2 millisecond/amu) resolves isotopes of doubly charged fragments. Scanning the entire 2000 m/z at this rate requires 400 milliseconds. More beneficially, only the first 1000 m/z is scanned at the enhanced scan rate, and the remaining 1000 m/z, where only singly charged fragments exists, is scanned at the normal scan rate. The total scan time for such a mode is about 260 milliseconds, which saves about 35% of the scan time required with prior methods.

Accordingly, while FIGS. 3A-3B disclose discrete values, such charts illustrate the capability of tailoring a system of the present invention to provide for a "multi-resolution scan rate", e.g., a scan rate of about 125,000.00 (amu/sec) down to about 27.78 (amu/sec), so as to enable time efficient measurements having the appropriate resolutions where desired over a mass spectrum.

It is to be understood that features described with regard to the various embodiments herein may be mixed and matched in any combination without departing from the spirit and scope of the invention. Although different selected embodiments have been illustrated and described in detail, it is to be appreciated that they are exemplary, and that a variety of substitutions and alterations are possible without departing from the spirit and scope of the present invention.

The invention claimed is:

1. A method for analyzing different spectral regions of a mass spectrum by means of a variable resolution mass spectrometer, comprising:

providing one or more product ions in a trapping chamber configured within said variable resolution mass spectrometer;

scanning said trapping chamber at a known scan rate within a first m/z region to provide for an appropriate first resolution of said one or more product ions;

switching to one or more desired scanning rates within other desired m/z regions so as to enable one or more other appropriate resolutions of said one or more product ions; and outputting to a user, a mass spectrum representative of said known rate and said one or more desired scanning rates.

2. The method of claim 1, wherein said known scan rate and said one or more desired scanning rates comprise a variable resolution scan rate ranging from about 125000.00 (amu/sec) down to about 27.78 (amu/sec).

3. The method of claim 1, wherein the steps of scanning and switching further comprises: configuring said known scan rate is enabled to resolve multiply charged product ions and configuring said one or more desired scanning rates is enabled to resolve unit space isotopes.

4. The method of claim 1, wherein said known scan rate or said one or more desired scanning rates is enabled to resolve one or more isobaric interferences from reporter ions in the low mass range from about 126 m/z up to about 131 m/z.

5. The method of claim 1, wherein said known scan rate or said one or more desired scanning rates is enabled to resolve one or more isobaric interferences from reporter ions in the low mass range from about 110 m/z up to about 117 m/z.

6. The method of claim 1, wherein the steps of scanning and switching further comprises: configuring said known scan rate and said one or more desired scanning rates to minimize detection non-linearity and saturation issues.

7. The method of claim 1, wherein said one or more trapped product ions are produced using at least one fragmentation process selected from: infrared multi-photon photo-dissociation (IRMPD), electron transfer dissociation (ETD), Pulsed Q dissociation (PQD), collision-induced dissociation (CID), and high energy C-trap dissociation (HCD).

* * * * *